US012194728B2

(12) United States Patent
Hamada

(10) Patent No.: US 12,194,728 B2
(45) Date of Patent: Jan. 14, 2025

(54) MEDIUM DRYING DEVICE AND RECORDING DEVICE

(71) Applicant: SEIKO EPSON CORPORATION, Tokyo (JP)

(72) Inventor: Nobuhiko Hamada, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 174 days.

(21) Appl. No.: 18/160,272

(22) Filed: Jan. 26, 2023

(65) Prior Publication Data

US 2023/0256751 A1 Aug. 17, 2023

(30) Foreign Application Priority Data

Jan. 27, 2022 (JP) ................................ 2022-010722

(51) Int. Cl.
*B41J 11/00* (2006.01)

(52) U.S. Cl.
CPC ............................... *B41J 11/00212* (2021.01)

(58) Field of Classification Search
CPC .. B41J 11/00212; B41J 15/16; B41J 11/0024; B41J 11/002
See application file for complete search history.

(56) References Cited

U.S. PATENT DOCUMENTS

| | | | | |
|---|---|---|---|---|
| 6,092,891 | A | 7/2000 | Okubo | |
| 2018/0154670 | A1 | 6/2018 | Sano | |
| 2020/0406646 | A1* | 12/2020 | Hamada | B41J 15/16 |

FOREIGN PATENT DOCUMENTS

| | | | |
|---|---|---|---|
| JP | 05-104706 | A | 4/1993 |
| JP | 2018-089926 | A | 6/2018 |

* cited by examiner

*Primary Examiner* — Lisa Solomon
(74) *Attorney, Agent, or Firm* — WORKMAN NYDEGGER

(57) ABSTRACT

A medium drying device is configured to dry a liquid applied onto a medium having an elongated shape and transported, and includes a surface portion having a first surface that is brought into contact with a medium, a heat source unit provided to a second surface, a winding unit configured to wind a medium, and a control unit configured to control driving of the winding unit. A transport path of the medium from a downstream end of the surface portion in a transport direction to the winding unit is configured so that the medium is curved at the downstream end as viewed in the width direction. The control unit controls driving of the winding unit when the medium is transported so that the medium is pressed against the surface portion at the plurality of curved portions and the downstream end.

9 Claims, 5 Drawing Sheets

MEDIUM DRYING DEVICE AND RECORDING DEVICE

The present application is based on, and claims priority from JP Application Serial Number 2022-010722, filed Jan. 27, 2022, the disclosure of which is hereby incorporated by reference herein in its entirety.

BACKGROUND

1. Technical Field

The present disclosure relates to a medium drying device and a recording device.

2. Related Art

Various medium drying devices have hitherto been used. Among those devices, there is known a device that dries a liquid applied onto an elongated medium being transported. It has been demanded for such a medium drying device to efficiently reduce a drying time. For example, JP-A-05-104706 discloses an ink-jet recording device including a heater and a fixing transport roller pressing elongated recording paper being transported against the heater.

In the ink-jet recording device in JP-A-05-104706, the fixing transport roller is used to press the recording paper against the heater for the purpose of reducing a drying time. However, with this configuration, there may be a risk that ink on the recording paper is transferred onto the fixing transport roller or a risk that the recording paper is damaged by the fixing transport roller. Thus, a technique described as the ink-jet recording device in JP-A-05-104706 cannot be employed in many cases. Therefore, with the medium drying device in the related art, it is difficult to efficiently reduce a time required for drying a liquid applied onto an elongated medium being transported.

SUMMARY

In order to solve the above-mentioned problem, a medium drying device according to the present disclosure is configured to dry a liquid applied onto a medium having an elongated shape and transported, the medium drying device includes a surface portion having a first surface that is brought into contact with the medium, a heat source unit provided to a second surface being a back surface opposite to the first surface of the surface portion, a winding unit being provided downstream of the surface portion in a transport direction of the medium and being configured to wind the medium, and a control unit configured to control driving of the winding unit, wherein the surface portion is provided with a plurality of curved portions being curved so that the first surface has a convex shape as viewed in a width direction intersecting with the transport direction, a transport path of the medium from a downstream end of the surface portion in the transport direction to the winding unit is configured so that the medium is curved at the downstream end as viewed in the width direction, and the control unit controls driving of the winding unit when the medium is transported, so that the medium is pressed against the surface portion at the plurality of curved portions and the downstream end.

DESCRIPTION OF EXEMPLARY EMBODIMENTS

Figure 1:
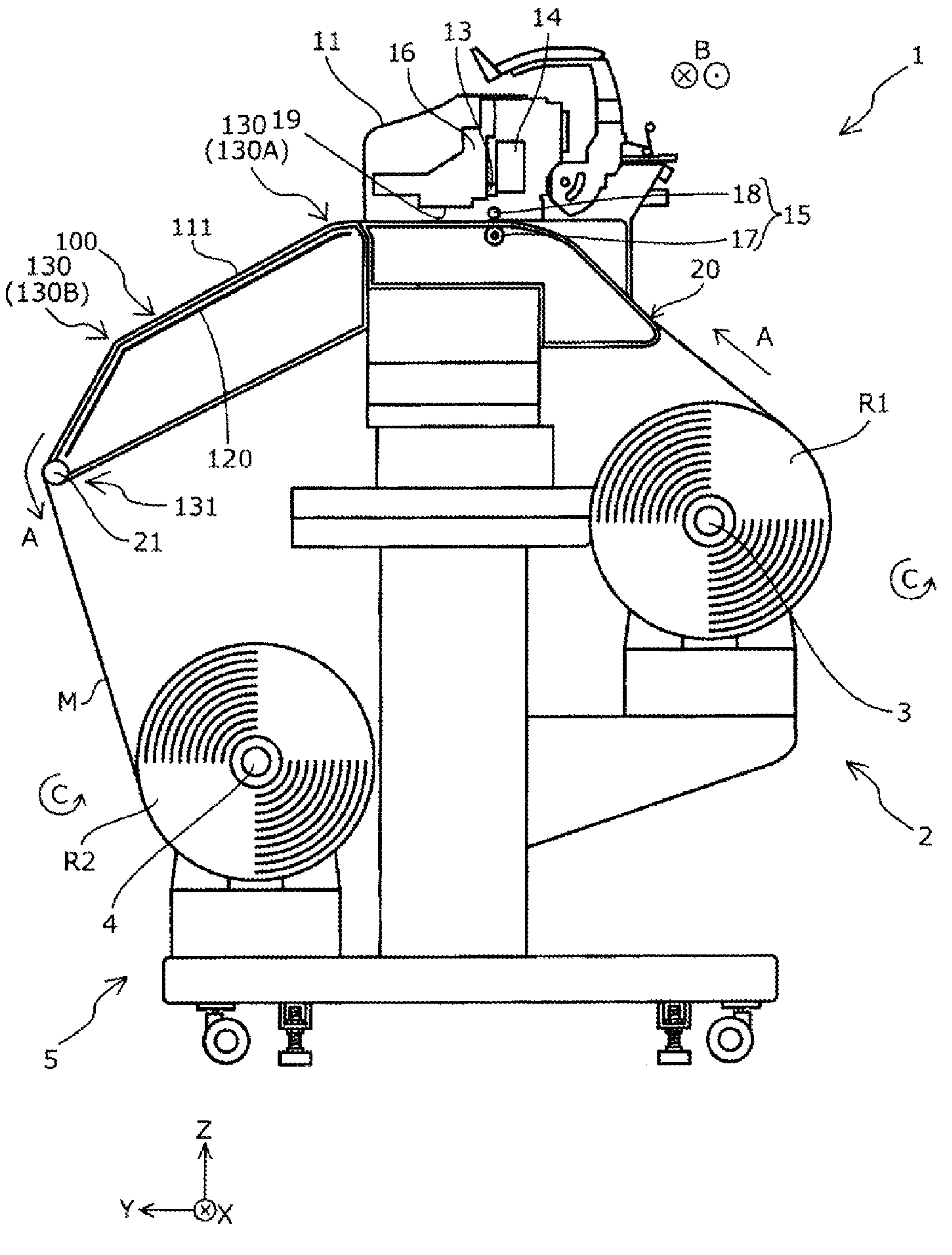
FIG. 1 is a schematic view of a recording device according to an exemplary embodiment of the present disclosure.

First, the present disclosure is schematically described.

In order to solve the above-mentioned problem, a medium drying device according to a first aspect of the present disclosure is a medium drying device configured to dry a liquid applied onto a medium having an elongated shape and transported, and includes a surface portion having a first surface that is brought into contact with the medium, a heat source unit provided to a second surface being a back surface opposite to the first surface of the surface portion, a winding unit being provided downstream of the surface portion in a transport direction of the medium and being configured to wind the medium, and a control unit configured to control driving of the winding unit, wherein the surface portion is provided with a plurality of curved portions being curved so that the first surface has a convex shape as viewed in a width direction intersecting with the transport direction, a transport path of the medium from a downstream end of the surface portion in the transport direction to the winding unit is configured so that the medium is curved at the downstream end as viewed in the width direction, and the control unit controls driving of the winding unit when the medium is transported, so that the medium is pressed against the surface portion at the plurality of curved portions and the downstream end.

According to the present aspect, the plurality of curved portions are provided to the surface portion that is brought into contact with the medium, and the transport path of the medium is configured so that the medium is curved at the downstream end of the surface portion. Further, when the medium is transported, the medium is pressed against the surface portion at the plurality of curved portions and the downstream end. Thus, the medium is firmly pressed at the curved portion and the downstream end, and hence the elongated medium being transported can efficiently be dried. Therefore, a time required for drying a liquid applied onto the medium can efficiently be reduced.

In the first aspect, in a medium drying device according to a second aspect of the present disclosure, the curved portion has an upstream flat surface portion having a flat shape and a downstream flat surface portion having a flat surface, the downstream flat surface portion being provided downstream of the upstream flat surface portion in the transport direction.

According to the present aspect, the curved portion has the upstream flat surface portion having a flat shape and the downstream flat surface portion having a flat shape. Thus, heating can be performed with the upstream flat surface portion and the downstream flat surface portion both of which have a flat shape in addition to the curved portion between the upstream flat surface portion and the downstream flat surface portion, and hence the elongated medium being transported can particularly efficiently be dried.

In the second aspect, in a medium drying device according to a third aspect of the present disclosure, the curved portion has a curved surface portion between the upstream flat surface portion and the downstream flat surface portion, the curved surface portion forming a curved surface as viewed in the width direction.

According to the present aspect, the curved portion has the curved surface portion between the upstream flat surface portion and the downstream flat surface portion. Thus, a contact area with the medium can be increased at the curved surface portion between the upstream flat surface portion and the downstream flat surface portion, and hence the drying efficiency of the medium at the curved portion can be improved.

In the second or third aspect, in a medium drying device according to a fourth aspect of the present disclosure, an angle formed between the downstream flat surface portion and the upstream flat portion, on the first surface side, of at least one of the plurality of curved portions as viewed in the width direction is from 20 degrees to 180 degrees.

According to the present aspect, the curved portion is formed so that the angle formed between the downstream flat surface portion and the upstream flat surface portion, on the first surface side, as viewed in the width direction is from 20 degrees to 180 degrees. The angle is from 20 degrees to 180 degrees, and hence the medium can particularly firmly be pressed against the curved portion. Thus, the drying efficiency of the medium at the curved portion can be improved.

In any one of the first aspect to the fourth aspect, in a medium drying device according to a fifth aspect of the present disclosure, the control unit controls driving of the winding unit when the medium is transported, so that a pressure larger than an own weight of the medium is applied to the surface portion at the plurality of curved portions and the downstream end.

According to the present aspect, when the medium is transported, a pressure larger than an own weight of the medium is applied to the surface portion at the plurality of curved portions and the downstream end. Thus, the medium can firmly be pressed at the curved portion and the downstream end, and hence the drying efficiency of the medium can be improved.

In any one of the first aspect to the fifth aspect, in a medium drying device according to a sixth aspect of the present disclosure, a plurality of types of media are usable as the medium, and the control unit controls a pressure with which the medium is pressed against the surface portion at the plurality of curved portions and the downstream end when the medium is transported, in accordance with a type of the medium to be used.

According to the present aspect, when the medium is transported, a pressure with which the medium is pressed against the surface portion at the plurality of curved portions and the downstream end is controlled in accordance with a type of the medium to be used. Thus, the medium can be pressed against the surface portion with a suitable pressure in accordance with a type of the medium to be used, and hence the elongated medium being transported can particularly efficiently be dried.

In any one of the first aspect to the sixth aspect, a medium drying device according to a seventh aspect of the present disclosure further includes a pressure detection unit configured to detect a pressure with which the medium is pressed against the surface portion, wherein the control unit feeds back a detection result obtained by the pressure detection unit, and controls a pressure with which the medium is pressed against the surface portion at the plurality of curved portions and the downstream end when the medium is transported.

According to the present aspect, the pressure detection unit is included. The detection result obtained by the pressure detection unit is fed back, and thus a pressure with which the medium is pressed against the surface portion at the plurality of curved portions and the downstream end is controlled when the medium is transported. Thus, the medium can be kept pressed against the surface portion with a suitable pressure, and hence the elongated medium being transported can particularly efficiently be dried.

In any one of the first aspect to the seventh aspect, a medium drying device according to an eighth aspect of the present disclosure further includes a temperature detection unit configured to detect a temperature of the surface portion, wherein the control unit controls a pressure with which the medium is pressed against the surface portion at the plurality of curved portions and the downstream end when the medium is transported, in accordance with a detection result obtained by the temperature detection unit.

According to the present aspect, the temperature detection unit is included. When the medium is transported, a pressure with which the medium is pressed against the surface portion at the plurality of curved portions and the downstream end is controlled based on the detection result obtained by the temperature detection unit. Thus, the medium can be pressed against the surface portion with a suitable pressure based on the temperature of the surface portion, and hence the elongated medium being transported can particularly efficiently be dried.

A recording device according to a ninth aspect of the present disclosure includes a recording unit configured to eject ink as the liquid onto the medium, and the medium drying device according to any one of the first aspect to the eighth aspect.

According to the present aspect, the recording unit that ejects ink is included, and the medium onto which the ink is applied can be dried. Thus, a time required for drying the ink applied onto the medium can efficiently be reduced.

Now, with reference to the drawings, an exemplary embodiment according to the present disclosure is specifically described. First, an outline of a recording device 1 according to an exemplary example is described with reference to FIG. 1. Note that, in FIG. 1, some component elements are omitted for clarity of configuration. Here, in the figures, an X-axis direction is a horizontal direction and a direction in which a shaft 3 of a medium setting unit 2 extends, a Y-axis direction is a horizontal direction and a direction orthogonal to the X-axis direction, and a Z direction is a vertical direction. Additionally, hereinafter, an arrow direction is a +direction, and a direction opposite to the arrow direction is a −direction. For example, a vertical upward direction is a +Z direction, and a vertical downward direction is a −Z direction.

The recording device 1 according to the present exemplary embodiment includes the medium setting unit 2 that supports a roll body R1 obtained by winding a sheet medium M for recording. Further, in the recording device 1 according to the present exemplary embodiment, when the medium M is transported in a transport direction A, the shaft 3 of the medium setting unit 2 rotates in a rotation direction C. The present exemplary embodiment uses the roll body R1 in which a recording surface to undergo recording faces outward. When using the roll body R1 in which the recording surface faces inward, the shaft 3 can be rotated in a direction opposite to the rotation direction C to feed the medium M from the roll body R1.

Further, the recording device 1 according to the present exemplary embodiment includes a transport path of the medium M. In the transport path, a medium support unit 20 that supports the medium M is provided, for example. Further, the recording device 1 includes a transport roller pair 15 that includes a driving roller 17 and driven rollers 18 for transporting the medium M in the transport direction A in the transport path. Note that, in the recording device 1 according to the present exemplary embodiment, the driving roller 17 is a roller extending in a width direction B intersecting with the transport direction A whereas the driven rollers 18 are a plurality of rollers provided and arranged in the width direction B to correspond to the driving roller 17 at positions facing the driving roller 17. However, the configuration of the transport unit for the medium M is not limited thereto.

Further, the medium support unit 20 is provided with a heater unit 100 that forms a part of the medium support unit 20 and is mounted to the recording device 1. Here, the heater unit 100 may be regarded as a constituent member of the recording device 1, and may be regarded as a medium drying device that dries the medium M at the same time. Moreover, the recording device 1 itself may be regarded as a medium drying device including the heater unit 100 being a constituent member of the recording device 1. Note that the heater unit 100 of the present exemplary embodiment is described later in detail. Further, a medium drying unit such as an air blower and a further heater unit for drying the medium M may be provided in addition to the heater unit 100 that heats the medium M.

The recording device 1 according to the present exemplary embodiment includes, inside the housing 11, a head 19 provided with a plurality of nozzles and configured to allow the nozzles to discharge inks to perform recording, as a recording unit, and a carriage 16 mounted with the head 19 and configured to move back and forth in the width direction B. Note that, in the recording device 1 according to the present exemplary embodiment, the transport direction A at a position on the medium support unit 20 facing the head 19 is a +Y direction, a direction in which the head 19 moves is a direction along the X-axis direction, and an ink ejection direction is the −Z direction.

Inside the housing 11, a plurality of frames 14 are formed, and a guide rail 13 that is mounted to one of the plurality of frames 14 and extends in the X-axis direction is formed. The carriage 16 provided with the head 19 is attached to the guide rail 13.

With the configuration described above, the head 19 is capable of performing recording by ejecting the ink from the nozzles (not illustrated) onto the medium M being transported while reciprocating in the width direction B intersecting with the transport direction A. The recording device 1 according to the present exemplary embodiment is capable of repeating feeding of the medium M in the transport direction A at a predetermined transport distance and discharging the ink while moving the head 19 in the width direction B when the medium M comes to a halt. With this, a desired image can be formed onto the medium M. However, in place of the head thus configured, there may be adopted a configuration including a so-called line head in which nozzles for ejecting ink are provided over the entire X-axis direction.

Further, a winding unit 5 is provided downstream of the head 19 in the transport direction A. The winding unit 5 is capable of winding the medium M as a roll body R2. Here, the winding unit 5 can also be regarded as a part of the medium drying device. Note that, in the present exemplary embodiment, the medium M is to be wound so that the recording surface faces outward. Thus, when the medium M is to be wound, the shaft 4 of the winding unit 5 rotates in the rotation direction C. Meanwhile, when winding takes place so that the recording surface faces inward, the shaft 4 is capable of rotating in the direction opposite to the rotation direction C and winding the medium M.

Further, a tension bar 21 is provided to a downstream end of a surface portion 111 of the heater unit 100 in the transport direction A. The tension bar 21 has a contact portion that is brought into contact with the medium M and extends in the width direction B, and is capable of applying a desired tension to the medium M. Here, as illustrated in FIG. 1, the transport path of the medium M from the downstream end of the surface portion 111 in the transport direction A to the winding unit 5 is configured so that the medium M is curved at the downstream end of the surface portion 111 in the transport direction A as viewed in the width direction B, and the tension bar 21 and the winding unit 5 are arranged to have such a transport path.

Note that, in the recording device 1 according to the present exemplary embodiment, the tension bar 21 is provided to the downstream end of the surface portion 111 so as to be continuous with the surface portion 111. In this manner, the tension bar 21 may be provided to be continuous with the surface portion 111, or may be provided away from the surface portion 111. In a configuration in which the tension bar 21 is provided away from the surface portion 111, when the transport direction A is changed between the surface portion 111 and the tension bar 21 as viewed in the width direction B, the downstream end of the surface portion 111 corresponds to the distal end of the surface portion 111. However, even in a configuration in which the tension bar 21 is provided away from the surface portion 111, when the transport direction A is not changed between the surface portion 111 and the tension bar 21 as viewed in the width direction B, it can be regarded that the tension bar 21 is provided to the downstream end of the surface portion 111.

Figure 2:
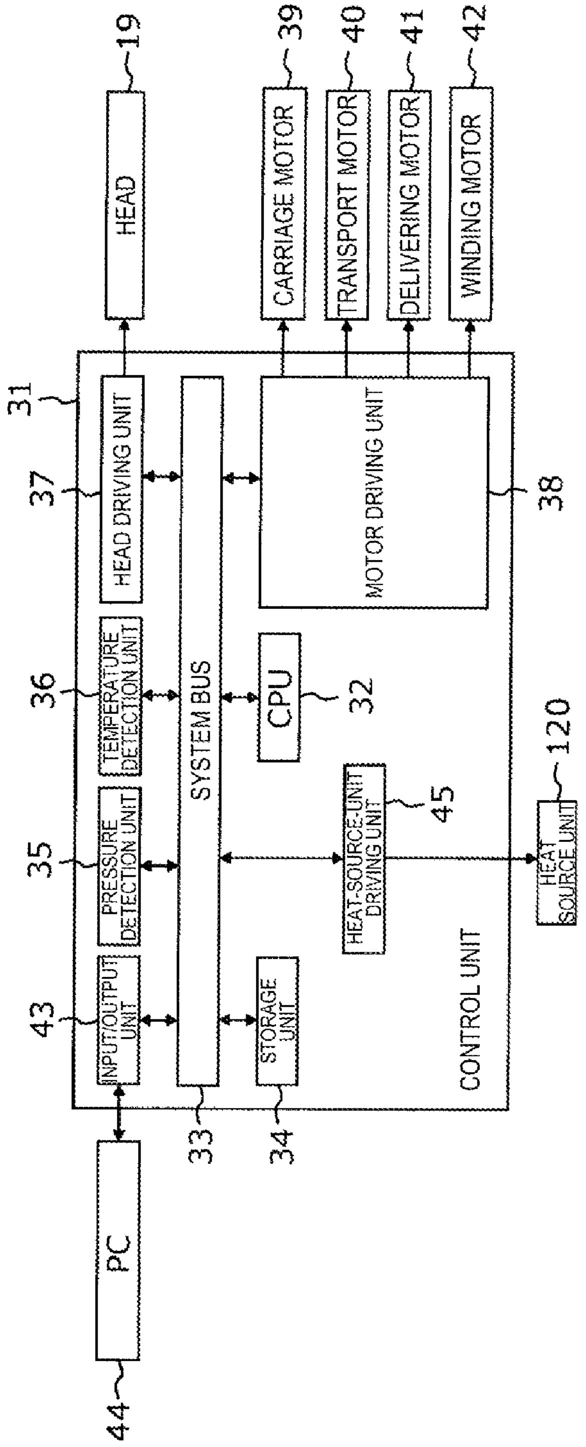
FIG. 2 is a block diagram illustrating an electrical configuration of the recording device in FIG. 1.

Next, the electrical configuration of the recording device 1 according to the present exemplary embodiment is described. FIG. 2 is a block diagram illustrating an electrical configuration of the recording device 1 according to the present exemplary embodiment. A control unit 31 includes a CPU 32 that manages control of the entire recording device 1. The CPU 32 is coupled to a storage unit 34 via a system bus 33. Examples of the storage unit 34 include a ROM that stores various control programs executed by the CPU 32, tables from Table 1 to Table 3, which are described later, and the like, a RAM capable of temporarily storing data, and an EEPROM being a non-volatile memory capable of rewriting and storing data.

Here, the CPU 32 is coupled to a pressure detection unit 35 via the system bus 33. The pressure detection unit 35 detects a pressure with which the medium M is pressed against the surface portion 111. Further, the CPU 32 is coupled to temperature detection unit 36 via the system bus 33. The temperature detection unit 36 detects a temperature of the surface portion 111. Further, the CPU 32 is coupled to a head driving unit 37 via the system bus 33 for driving the head 19.

Further, via the system bus 33, the CPU 32 is coupled to a motor driving unit 38 that is coupled to a carriage motor 39, a transport motor 40, a delivering motor 41, and a winding motor 42. Here, the carriage motor 39 is a motor for moving, in the width direction B, the carriage 16 having the head 19 mounted thereon. Further, the transport motor 40 is a motor for driving the driving roller 17 that forms the transport roller pair 15. Moreover, the delivering motor 41 is a rotating mechanism for the shaft 3, and is a motor for driving the shaft 3 to deliver the medium M to the transport roller pair 15. Further, the winding motor 22 is a driving motor for rotating the shaft 4 of the winding unit 5.

In addition, the CPU 32 is coupled to a heat-source-unit driving unit 45 that drives a heat source unit 120 being a heat source of the heater unit 100, via the system bus 33. Further, via the system bus 33, the CPU 32 is coupled to an input/output unit 43 that is coupled to a PC 44 for receiving and transmitting data such as recording data and signals.

With this configuration, the control unit 31 of the present exemplary embodiment is capable of controlling the head 19, the driving roller 17, the carriage 16, the heat source unit 120, the winding unit 5, and the like. Further, the control unit 31 controls the head 19, the driving roller 17, the carriage 16, the heat source unit 120, the winding unit 5, and the like. With this, the recording device 1 according to the present exemplary embodiment is configured to be capable of heating the surface portion 111, winding the medium M about the shaft 4, alternatingly repeating transport of the medium M by a predetermined amount and ejection of the ink while moving the head 19 in the width direction B, and executing recording.

Figure 3:
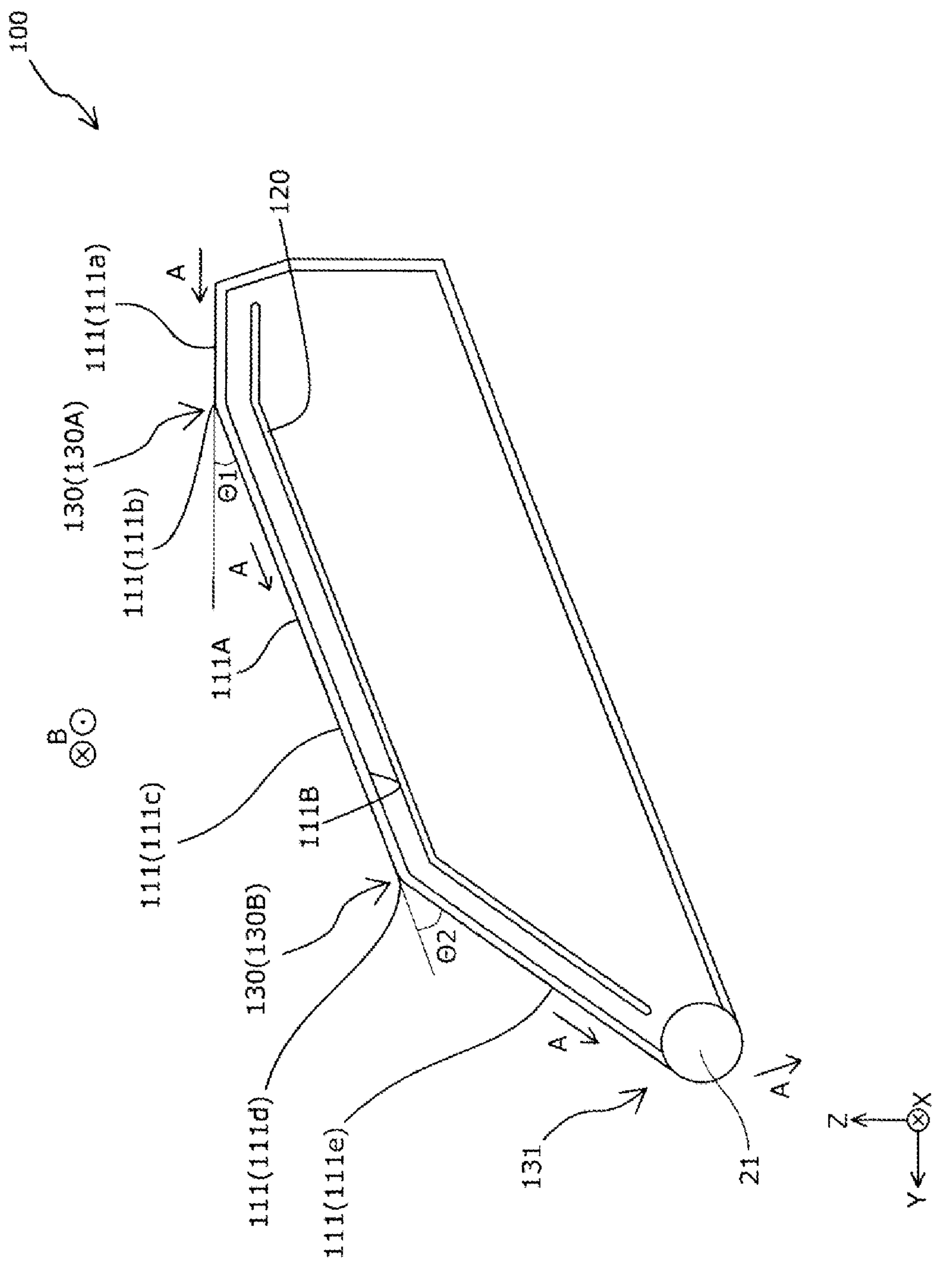
FIG. 3 is a side view of a heater unit of the recording device in FIG. 1.

Next, with further reference to FIG. 3 in addition to FIG. 1 and FIG. 2, description is made on a specific configuration of the heater unit 100 being a main unit of the recording device 1 according to the present exemplary embodiment and functions of the recording device 1 according to the present exemplary embodiment as the medium drying device. The heater unit 100 of the present exemplary embodiment is a medium drying device that dries the ink being a liquid ejected from the head 19 of the recording device 1 onto the medium M. However, a device other than the recording device 1 may be used as long as drying of the elongated medium M being transported is achieved, and a medium drying device that dries a liquid other than the ink, which is applied onto the medium M, may be provided.

As illustrated in FIG. 3, the recording device 1 as the medium drying device according to the present exemplary embodiment includes the surface portion 111 having a first surface 111A brought into contact with the medium M. Further, as illustrated in FIG. 3, the heat source unit 120 is included. The heat source unit 120 is provided to a second surface 111B being a back surface opposite to the first surface 111A of the surface portion 111. Further, as illustrated in FIG. 1, there is included the winding unit 5 that is provided downstream of the surface portion 111 in the transport direction A of the medium M and winds the medium M. Further, as illustrated in FIG. 2, there is included the control unit 31 that controls driving of the winding unit 5.

Further, as illustrated in FIG. 3, the surface portion 111 is provided with a plurality of curved portions 130 being curved so that the first surface 111A has a convex shape as viewed in the width direction B. The plurality of curved portions 130 include a curved portion 130A and a curved portion 130B. Further, as illustrated in FIG. 1, the medium transport path from the downstream end of the surface portion 111 in the transport direction A to the winding unit 5 is configured so that the medium M is curved at the downstream end as viewed in the width direction B. Here, in the recording device 1 according to the present exemplary embodiment, the control unit 31 controls driving of the winding unit 5 when the medium M is transported so that the medium M is pressed against the surface portion 111 at the curved portion 130A and the curved portion 130B being the plurality of curved portions 130 and the tension bar 21 provided to the downstream end.

In this manner, the recording device 1 according to the present exemplary embodiment is configured so that the plurality of curved portions 130 are provided to the surface portion 111 brought into contact with the medium M, the transport path of the medium M is configured so that the medium M is curved at the downstream end of the surface portion 111 (tension bar 21). Further, when the medium M is transported, the medium M is pressed against the surface portion 111 at the plurality of curved portions 130 and the tension bar 21. The recording device 1 according to the present exemplary embodiment is thus configured. Therefore, the medium M is firmly pressed at the curved portion 130 and the tension bar 21, and hence the elongated medium M being transported can efficiently be dried. Therefore, with the recording device 1 according to the present exemplary embodiment, a time required for drying the liquid applied onto the medium M can efficiently be reduced.

Here, description is made in view of the recording device. The recording device 1 according to the present exemplary embodiment includes the head 19 that ejects the ink being a liquid onto the medium M and the heater unit 100 being the medium drying device thus configured. As described above, the recording device 1 according to the present exemplary embodiment includes the head 19 being a recording unit that ejects the ink, and further includes the heater unit 100 described above. Therefore, a time required for drying the ink applied onto the medium M can efficiently be reduced.

Further, as illustrated in FIG. 3, the curved portion 130A is configured so that a curved surface portion 111*b* is sandwiched between a flat surface portion 111*a* having a flat shape and a flat surface portion 111*c* having a flat shape in the transport direction A. Similarly, as illustrated in FIG. 3, the curved portion 130B is configured so that a curved surface portion 111*d* is sandwiched between the flat surface portion 111*c* having a flat shape and a flat surface portion 111*d* having a flat shape in the transport direction A. In other words, each of the two curved portions 130 has the upstream flat surface portion having a flat shape and the downstream flat surface portion having a flat surface, the downstream flat surface portion being provided downstream of the upstream flat surface portion in the transport direction A. The recording device 1 according to the present exemplary embodiment is thus configured. Therefore, heating can be performed with the upstream flat surface portion and the downstream flat surface portion both of which have a flat shape in addition to the curved surface portion 111*b* and the curved surface portion 111*d* being the curved portions between the upstream flat surface portions and the downstream flat surface portions. Thus, the elongated medium M being transported can particularly efficiently be dried.

Further, as described above, the curved portion 130A has the curved surface portion 111*b* between the flat surface portion 111*a* being the upstream flat surface portion and the flat surface portion 111*c* being the downstream flat surface portion, the curved surface portion 111*b* forming a curved surface as viewed in the width direction B. Similarly, the curved portion 130B has the curved surface portion 111*d* between the flat surface portion 111*c* being the upstream flat surface portion and the flat surface portion 111*e* being the downstream flat surface portion, the curved surface portion 111*d* forming a curved surface as viewed in the width direction B. The recording device 1 according to the present exemplary embodiment is thus configured. Therefore, the contact areas with the medium M can be increased at the curved surface portion 111*b* and the curved surface portion 111*d* being the curved portions between the upstream flat surface portions and the downstream flat surface portions, and hence the drying efficiency of the medium M at the curved portions can be improved. Here, the "curved surface portion" may be a curved surface having a constant curvature, or may be a curved surface having a plurality of curvatures. Note that, as described above, in the present exemplary embodiment, the curved surface portion is provided between the upstream flat surface portion and the downstream flat surface portion. However, the present disclosure is not limited to such a configuration. For example, a surface member having a slight curvature may be used in place of the upstream flat surface portion and the downstream flat surface portion, or a corner portion having a sharp tip end as viewed in the width direction B may be used in place of the curved surface portion.

Note that, the angle is formed by the first surface 111A of the downstream flat surface portion with respect to the upstream flat surface portion of at least one of the plurality of curved portions 130 as viewed in the width direction B. The angle is preferably from 20 degrees to 180 degrees. When the angle is from 20 degrees to 180 degrees, the medium M cab particularly firmly be pressed at the curved portion 130, and the drying efficiency of the medium M at the curved portion 130 can be improved. Note that the angle is particularly preferred to be 30 degrees or larger. Both angles θ1 and θ2, which are illustrated in FIG. 3, of the angles in the present exemplary embodiment are 31 degrees.

Further, when the medium M is transported, the control unit 31 preferably controls driving of the winding unit 5 so that a pressure larger than an own weight of the medium M is applied onto the surface portion 111 at the plurality of curved portions 130 and the tension bar 21 being the downstream end of the surface portion 111. With this control, the medium M can firmly be pressed at the curved portion 130 and the tension bar 21, and hence the drying efficiency of the medium M can be improved.

Figure 4:
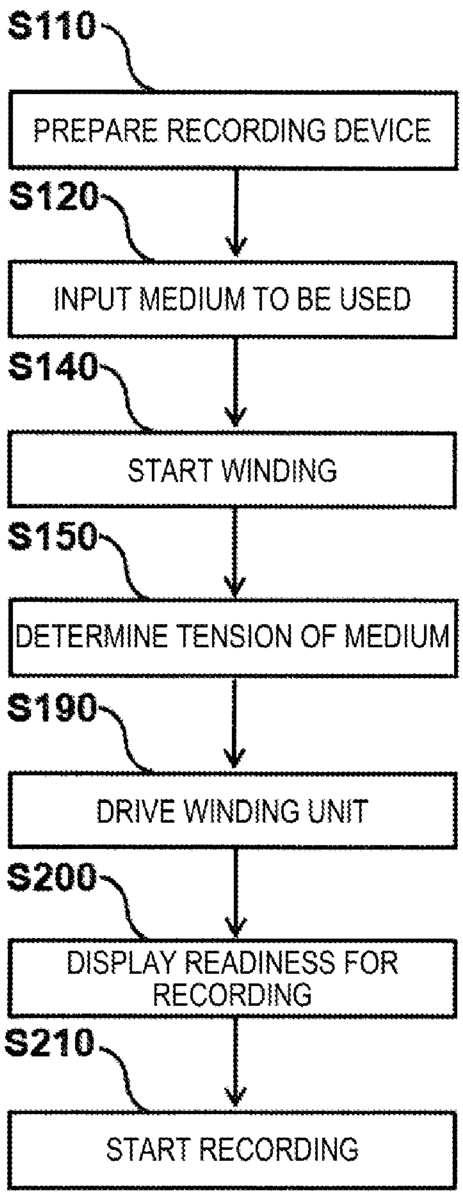
FIG. 4 is a flowchart illustrating a driving method of the recording device in FIG. 1 according to an exemplary embodiment.

Next, a driving method that can be executed by the recording device 1 according to the present exemplary embodiment is described. FIG. 4 is a flowchart of an exemplary embodiment relating to the driving method that can be executed by the recording device 1 according to the present exemplary embodiment. In the flowchart of FIG. 4, first, preparation is performed for starting recording with the recording device 1 in Step S110. Specifically, the preparation corresponds to turning on the power of the recording device 1 by a user, setting of the medium M in the recording device 1, or the like.

Subsequently, in Step S120, a user inputs the medium M to be used through the PC 44, an operating panel (not illustrated), or the like. Subsequently, in Step S140, the winding unit 5 starts winding of the medium M. The control in this step is performed when the control unit 31 controls the winding motor 42 via the motor driving unit 38.

Subsequently, in Step S150, the control unit 31 determines a pressure to be applied onto the medium M, based on a detection result of the pressure detection unit 35 indicating a pressure with which the medium M is pressed against the surface portion 111 and a detection result of the temperature detection unit 36 indicating a temperature of the surface portion 111. Specifically, in the recording device 1 according to the present exemplary embodiment, a plurality of types may be used as the medium M. For example, a pressure to be applied onto the medium M is determined from the detection result of the temperature detection unit 36 indicating a temperature of the surface portion 111, based on the tables including Table 1, Table 2, and Table 3 given below. Here, Table 1 corresponds to a case in which the medium M is thin and soft, Table 2 corresponds to a case in which the medium M has medium thickness and medium softness, and Table 3 corresponds to a case in which the medium M is thick and stiff.

TABLE 1

| Surface portion temperature (degree Celsius) | Tensile force (kgf) |
|---|---|
| 60 | 1.7 |
| 65 | 1.5 |
| 70 | 1.3 |
| 75 | 1.1 |
| 80 | 0.9 |

TABLE 2

| Surface portion temperature (degree Celsius) | Tensile force (kgf) |
|---|---|
| 60 | 1.9 |
| 65 | 1.7 |
| 70 | 1.5 |
| 75 | 1.3 |
| 80 | 1.1 |

TABLE 3

| Surface portion temperature (degree Celsius) | Tensile force (kgf) |
|---|---|
| 60 | 2.1 |
| 65 | 1.9 |
| 70 | 1.7 |
| 75 | 1.5 |
| 80 | 1.3 |

Note that, in Step S150, it is assumed that a pressure to be applied onto the medium M is determined from the detection result of the temperature detection unit 36 indicating a temperature of the surface portion 111. However, in place of Step S150, there may be executed a step of determining a temperature of the heat source unit 120 from the detection result of the pressure detection unit 35 indicating a pressure with which the medium M is pressed against the surface portion 111.

Subsequently, in Step S190, the winding unit 5 is driven so that the pressure determined in Step S150 is applied onto the medium M. Specifically, the control in this step is performed when the control unit 31 controls the winding motor 42 via the motor driving unit 38. Note that execution of Step S150 and Step S190 continues as feedback control until recording started in Step S210 described later is completed.

Subsequently, in Step S200, a monitor or an operating panel (not illustrated) provided to the PC 44 displays readiness for recording. Then, recording is started in Step S210. Specifically, as described above, the control unit 31 controls the head 19, the driving roller 17, the carriage 16, the heat source unit 120, the winding unit 5, and the like. With this, the recording device 1 according to the present exemplary embodiment heats the surface portion 111, winds the medium M about the shaft 4, alternatingly repeats transport of the medium M by a predetermined amount and ejection of the ink while moving the head 19 in the width direction B, and executes recording. Note that, as described above, execution of the feedback control in Step S150 and Step S190 continues during execution of recording.

Subsequently, with reference to the flowchart of FIG. 5, description is made on an exemplary embodiment relating to the driving method that can be executed by the recording device 1 according to the present exemplary embodiment, which is different from the driving method illustrated in the flowchart of FIG. 4. Note that, in the flowchart of FIG. 5, the steps similar to those in the flowchart of FIG. 4 are denoted with the same step numerical symbols, and description therefor is omitted below.

Figure 5:
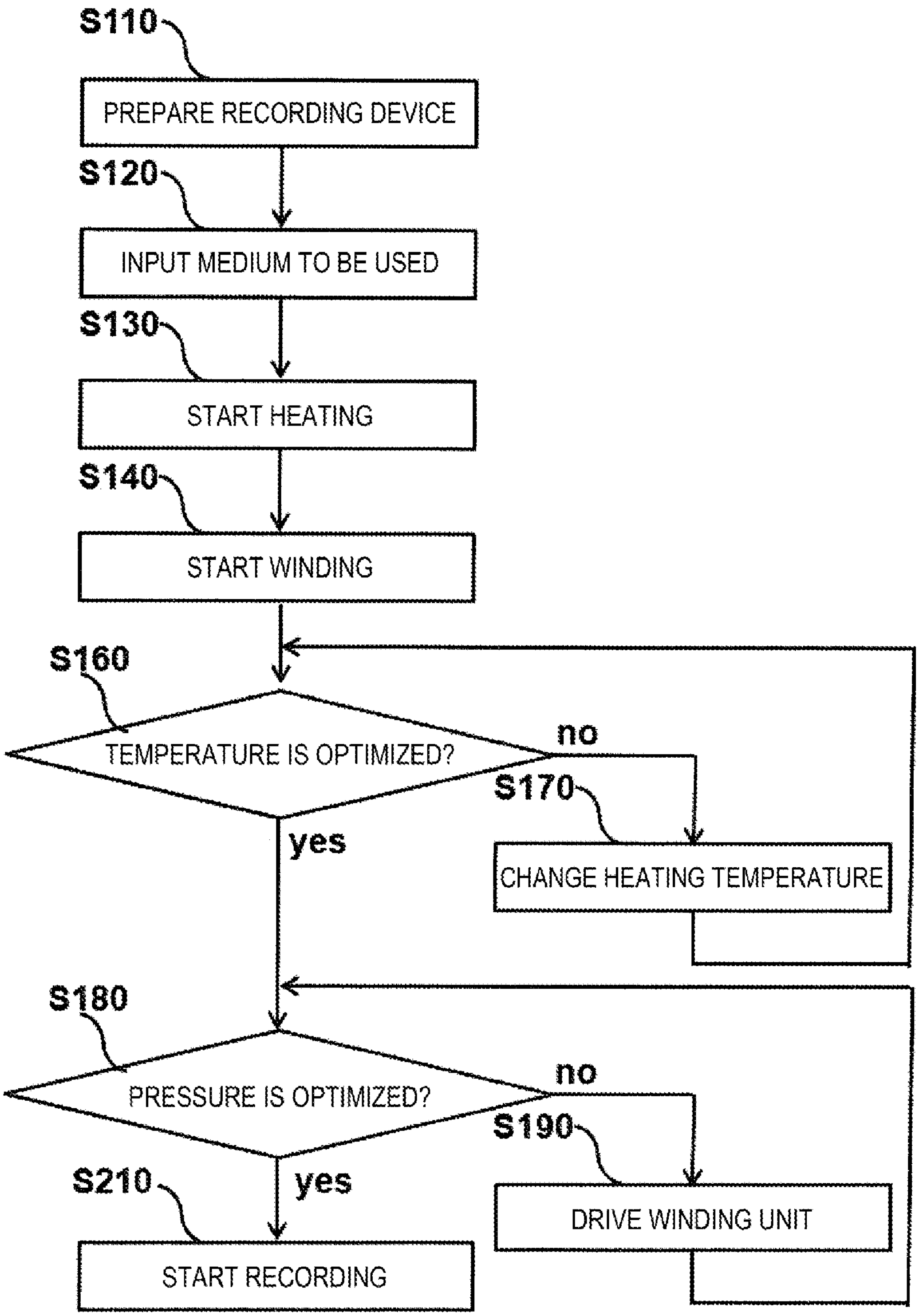
FIG. 5 is a flowchart illustrating a driving method of the recording device in FIG. 1, which is different from FIG. 4.

In the flowchart of FIG. 5, subsequently to Step S120, the processing proceeds to Step S130 and then to Step S140. In Step S130, the control unit 31 controls the heat-source-unit driving unit 45, and thus drives the heat source unit 120. With this, heating of the surface portion 111 is started. Further, subsequently to Step S140, the processing proceeds to Step S160.

In Step S160, the control unit 31 determines whether the heat source unit 120 performs heating at an optimized temperature, from the detection result of the temperature detection unit 36 indicating a temperature of the surface portion 111. Whether the heat source unit 120 performs heating at an optimized temperature can be determined by, for example, comparison with a setting value input by a user through the PC 44, an operating panel (not illustrated), or the like. When the control unit 31 determines that the heat source unit 120 performs heating at an optimized temperature in Step S160, the processing proceeds to Step S180. Meanwhile, when the control unit 31 does not determine that the heat source unit 120 performs heating at an optimized temperature in Step S160, the processing proceeds to Step S170. The heating temperature of the heat source unit 120 is changed in Step S170, and the processing returns to Step S160. Step S160 and Step S170 are repeated until the control unit 31 determines that the heat source unit 120 performs heating at an optimized temperature.

In Step S180, the control unit 31 determines whether the winding unit 5 applies an optimized tensile force onto the medium M, from the detection result of the pressure detection unit 35 indicating a pressure with which the medium M is pressed against the surface portion 111. Whether a tensile force applied onto the medium M is optimized can be determined by, for example, comparison with a setting value input by a user through the PC 44, an operating panel (not illustrated), or the like. When the control unit 31 determines that the detection result indicating a pressure onto the medium M is optimized in Step S180, the processing proceeds to Step S210. Meanwhile, when the control unit 31 does not determine that the detection result indicating a pressure onto the medium M is optimized in Step S180, the processing proceeds to Step S190. The winding unit 5 is driven to change a tensile force to be applied onto the medium M in Step S190, and the processing returns to Step S180. Step S180 and Step S190 are repeated until the control unit 31 determines that the detection result indicating a pressure onto the medium M is optimized.

As described above, in the recording device 1 according to the present exemplary embodiment, a plurality of types may be used as the medium M. Further, as illustrated in Step S150 in the flowchart of FIG. 4, when the medium M is transported, in accordance with a type of the medium to be used, the control unit 31 is capable of controlling a pressure with which the medium M is pressed against the surface portion 111 at the plurality of curved portions 130 and the tension bar 21 at the downstream end. Thus, in the recording device 1 according to the present exemplary embodiment, the medium M can be pressed against the surface portion 111 with a suitable pressure in accordance with a type of the medium M to be used, and hence the elongated medium M being transported can particularly efficiently be dried.

Further, as described above, the recording device 1 according to the present exemplary embodiment includes the pressure detection unit 35 that detects a pressure with which the medium M is pressed against the surface portion 111. Further, as illustrated in, for example, Step S150 and Step S190 in the flowchart of FIG. 4, the control unit 31 is capable of feeding back the detection result obtained by the pressure detection unit 35, and thus is capable of controlling a pressure with which the medium M is pressed against the surface portion 111 at the plurality of curved portions 130 and the tension bar 21 at the downstream end when the medium M is transported. Thus, in the recording device 1 according to the present exemplary embodiment, the medium M can be kept pressed against the surface portion 111 with a suitable pressure, and hence the elongated medium M being transported can particularly efficiently be dried.

Further, as described above, the recording device 1 according to the present exemplary embodiment includes the temperature detection unit 36 that detects a temperature of the surface portion 111. Further, as illustrated in, for example, Step S150 and Step S190 in the flowchart of FIG. 4, when the medium M is transported, in accordance with the detection result obtained by the temperature detection unit 36, the control unit 31 is capable of controlling a pressure with which the medium M is pressed against the surface portion 111 at the plurality of curved portions 130 and the tension bar 21 at the downstream end. Thus, in the recording device 1 according to the present exemplary embodiment, the medium M can be pressed against the surface portion 111 with a suitable pressure based on the temperature of the surface portion 111, and hence the elongated medium M being transported can particularly efficiently be dried.

The present disclosure is not limited to the exemplary embodiment described above, and can be realized in various configurations without departing from the gist of the present disclosure. Further, appropriate replacements or combinations may be made to the technical features in the present exemplary embodiment which correspond to the technical features in the aspects described in the SUMMARY section to solve some or all of the problems described above or to achieve some or all of the advantageous effects described above. Additionally, when the technical features are not described herein as essential technical features, such technical features may be deleted appropriately.

What is claimed is:

1. A medium drying device configured to dry a liquid applied onto a medium having an elongated shape and transported, the medium drying device comprising:

a surface portion having a first surface that is brought into contact with the medium;

a heat source unit provided to a second surface being a back surface opposite to the first surface of the surface portion;

a winding unit being provided downstream of the surface portion in a transport direction of the medium and being configured to wind the medium; and a control unit configured to control driving of the winding unit, wherein the surface portion is provided with a plurality of curved portions being curved so that the first surface has a convex shape as viewed in a width direction intersecting with the transport direction, a transport path of the medium from a downstream end of the surface portion in the transport direction to the winding unit is configured so that the medium is curved at the downstream end as viewed in the width direction, and the control unit controls driving of the winding unit when the medium is transported, so that the medium is pressed against the surface portion at the plurality of curved portions and the downstream end.

2. The medium drying device according to claim 1, wherein the curved portion has an upstream flat surface portion having a flat shape and a downstream flat surface portion having a flat surface, the downstream flat surface portion being provided downstream of the upstream flat surface portion in the transport direction.

3. The medium drying device according to claim 2, wherein the curved portion has a curved surface portion between the upstream flat surface portion and the downstream flat surface portion, the curved surface portion forming a curved surface as viewed in the width direction.

4. The medium drying device according to claim 2, wherein an angle formed between the downstream flat surface portion and the upstream flat portion, on the first surface side, of at least one of the plurality of curved portions as viewed in the width direction is from 20 degrees to 180 degrees.

5. The medium drying device according to claim 1, wherein the control unit controls driving of the winding unit when the medium is transported, so that a pressure larger than an own weight of the medium is applied to the surface portion at the plurality of curved portions and the downstream end.

6. The medium drying device according to claim 1, wherein a plurality of types of media are usable as the medium, and the control unit controls a pressure with which the medium is pressed against the surface portion at the plurality of curved portions and the downstream end when the medium is transported, in accordance with a type of the medium to be used.

7. The medium drying device according to claim 1, further comprising:

a pressure detection unit configured to detect a pressure with which the medium is pressed against the surface portion, wherein the control unit feeds back a detection result obtained by the pressure detection unit, and controls a pressure with which the medium is pressed against the surface portion at the plurality of curved portions and the downstream end when the medium is transported.

8. The medium drying device according to claim 1, further comprising:

a temperature detection unit configured to detect a temperature of the surface portion, wherein the control unit controls a pressure with which the medium is pressed against the surface portion at the plurality of curved portions and the downstream end when the medium is transported, in accordance with a detection result obtained by the temperature detection unit.

9. A recording device, comprising:

a recording unit configured to eject ink as the liquid onto the medium; and the medium drying device according to claim 1.

* * * * *